United States Patent [19]

Mizuno

[11] Patent Number: 5,301,743
[45] Date of Patent: Apr. 12, 1994

[54] COOLING ABNORMALITY DETECTION SYSTEM FOR ELECTRONIC EQUIPMENT

[75] Inventor: Tsukasa Mizuno, Tokyo, Japan

[73] Assignee: NEC Corporation, Tokyo, Japan

[21] Appl. No.: 945,629

[22] Filed: Sep. 16, 1992

Related U.S. Application Data

[60] Division of Ser. No. 802,694, Dec. 5, 1991, Pat. No. 5,174,364, which is a continuation of Ser. No. 409,742, Sep. 20, 1989, abandoned.

[30] Foreign Application Priority Data

Sep. 21, 1988 [JP] Japan ................... 63-234880
Jan. 11, 1989 [JP] Japan ................... 1-4491
Mar. 28, 1989 [JP] Japan ................... 1-77219

[51] Int. Cl.$^5$ ............... F28D 15/00; G01K 17/00; H02B 1/00; H05K 7/20
[52] U.S. Cl. ............... 165/12; 165/11.1; 165/13; 165/104.33; 361/699
[58] Field of Search ............... 165/12, 11.1, 13, 104.33; 361/385

[56] References Cited

U.S. PATENT DOCUMENTS

| | | | |
|---|---|---|---|
| 4,729,424 | 3/1988 | Mizuno | 165/30 |
| 5,086,829 | 2/1992 | Asakawa | 361/385 |
| 5,174,364 | 12/1992 | Mizuno | 165/11.1 |

OTHER PUBLICATIONS

Mizuno et al., "Cooling Technology For the NEC SX Super Computer" Proceedings of the International Symposium on Cooling Technology For Electronic Equipment Mar. 17–21, 1987, pp. 110–125.

Electro Impulse Co., *Microwave Journal*, "Self-Cooled High-Power RF Load", vol. 19, No. 4, Apr. 1976, p. 36.

*Primary Examiner*—John K. Ford
*Attorney, Agent, or Firm*—Foley & Lardner

[57] ABSTRACT

An excess heat abnormality detection and alarm system for external electronic equipment includes a protection unit containing a timer for counting a predetermined period of time and outputting a time output signal, a temperature measuring means for causing temperature sensors to measure the temperatures of the electronic components, a first and second abnormal temperature discriminating means, the first abnormal temperature discriminating means being operated for a predetermined period of time set in the timer means. The first abnormal temperature discriminating means identifies or discriminates one of the temperatures measured by the temperature measuring means as an abnormal temperature. A second abnormal temperature discriminating means operated after a predetermined period of time set in the timer means distinguishes between the two temperatures measured by the temperature measuring means. The abnormality alarm means receives an abnormality signal from the first and second abnormal temperature discriminating means and generates a stop signal, which controls the power supplied to each of the external electronic components.

1 Claim, 10 Drawing Sheets

COOLING ABNORMALITY DETECTION SYSTEM FOR ELECTRONIC EQUIPMENT

This application is a division of application Ser. No. 07/802,694, filed Dec. 5, 1991 now Pat. No. 5,174,364 which is a continuation of application Ser. No. 07/409,742 filed Sep. 20, 1989 now abandoned.

BACKGROUND OF THE INVENTION

The present invention relates to a cooling abnormality detection system for electronic equipment and, more particularly, to a cooling abnormality detection system for electronic equipment which prevents reliability degradation and breakdown of the electronic equipment due to heat.

In recent years, large scale integration and a higher packing density of circuit elements have progressed in electronic equipment such as computers to improve performance. Along with this trend, heat generating density inside the equipment increased, and electronic equipment frequently employs a cooling system using a liquid coolant. A typical conventional cooling system employs a flat plate through which a liquid coolant flows, to cool the electronic equipment through this flat plate. In this system, a temperature sensor or element having an equivalent function is arranged in an element or in electronic equipment. An output from this sensor is monitored to prevent reliability degradation or breakdown of electronic elements and equipment due to heat.

FIG. 1 is a block diagram showing an arrangement of a conventional cooling abnormality detection system for cooling electronic equipment serving as a heating element by using the liquid coolant.

Referring to FIG. 1, reference numeral 11 denotes a cooling device; 12, a protection unit; 13, a heat exchanger for re-cooling the liquid coolant whose temperature is increased upon cooling of electronic components 43; 14, a tank for absorbing an increase/decrease in volume of the liquid coolant upon temperature change; 15, a pump for circulating the liquid coolant to electronic equipment 40; 16, an outlet port for supplying the liquid coolant to the electronic equipment 40; and 17, an inlet port for receiving the liquid coolant from the electronic equipment 40. The protection unit 12 sends a start or stop command to the heat exchanger 13 and the pump 15 through operation command lines 20. Reference numeral 23 denotes a flowmeter for measuring a flow rate of the liquid coolant during the operation of the pump. The flowmeter 23 informs the protection unit 12 of an abnormality through an abnormality detection line 25 when the actual flow rate is lower than a predetermined rate during the operation of the pump. Reference numeral 41 denotes an operation control unit for starting/stopping power supply to the electronic components 43; 18, a cooling piping for interconnecting the cooling device 11 and the electronic equipment 40; and 30, an abnormality signal line for signaling the abnormality of the cooling device 11 to the operation control unit 41. Reference numeral 42 denotes a temperature measuring the unit for measuring temperatures of temperature sensors 44 (AD590 or AD592 available from Analog Devices Inc.) respectively arranged inside the electronic components 43; and 33, a temperature abnormality signal line for signaling a temperature abnormality from the temperature measuring unit 42 to the protection unit 12.

With the above arrangement, when the flowmeter 23 detects a decrease in a circulating flow rate of the liquid coolant, which disables continuous cooling in the cooling device 11, the protection unit 12 drives the abnormality signal line 30 and sends an abnormality signal to the operation control unit 41. Thereafter, the operation control unit 41 stops power supply to the electronic components 43, thereby preventing reliability degradation or breakdown of the electronic components 43 due to heat.

When the temperature measuring unit 42 detects that power is supplied to the electronic components 43 through power signal lines (not shown) under the control of the operation control unit 41, the temperature measuring unit 42 starts measuring the temperatures of the temperature sensors 44. The temperature measuring unit 42 determines whether the measured temperatures exceed a predetermined temperature. The predetermined temperature is set to be a temperature which has almost no influence on the reliability of the electronic components 43.

When the temperature of one of the electronic components 43 exceeds the predetermined temperature, the temperature measuring unit 42 determines an abnormality and informs the protection unit 12 of an abnormality through the temperature abnormality signal line 33. When the protection unit 12 receives the abnormality signal through the temperature abnormality signal line 33, it immediately informs the operation control unit 41 of an abnormality through the abnormality signal line 30. Thereafter, the operation control unit 41 stops power supply to the electronic components 43, thereby preventing reliability degradation or breakdown of the electronic components 43 due to heat.

In the above temperature abnormality detection, when the temperature measuring unit 42 determines that the measurement results exhibit high temperatures which exceed the highest rated temperature, the temperature measuring unit 42 informs the protection unit 12 of a "temperature sensor abnormality" through the temperature abnormality signal line 33. In a normal operation, a criterion for determining an abnormality of each temperature sensor 44 is set as a temperature higher by 20° C. to 50° C. than the predetermined temperature for determining an abnormality in the electronic components 43.

In this manner, when abnormality data from the flowmeter 23 or the temperature measuring unit 42 is signaled, the protection unit 12 informs the operation control unit 41 of an abnormality, and causes it to stop power supply to the electronic components 43, thereby preventing reliability degradation or breakdown of the electronic components 43 due to heat.

The conventional cooling abnormality detection system has the following drawbacks.

(1) When an abnormal flow rate of the liquid coolant is detected by the flowmeter, the protection unit stops power supply to the electronic components upon detection of an abnormal flow rate of the liquid coolant by the flowmeter. Therefore, even if a flow rate is normal, when a flow rate of the liquid coolant is decreased by an operation error or failure of the flowmeter, the protection unit determines an "abnormal flow rate". Then, the abnormality signal is sent to the operation control unit arranged inside the electronic equipment to stop power supply to the electronic components.

(2) When an abnormality of an electronic equipment is to be detected by the temperature sensors, power supply to the electronic components is stopped upon detection of an abnormal temperature of one of the electronic components. Therefore, even if the electronic component itself is normally cooled, an "abnormal temperature" is determined upon occurrence of an abnormality in one of the temperature sensors. Then, the abnormality signal is sent to the operation control unit inside the electronic equipment, and the power supply to the electronic components is undesirably interrupted.

(3) Drawback (2) can be solved when determination reference for the "temperature sensor abnormality" is provided to determine the "temperature sensor abnormality" as described with reference to the prior art. However, even in this case, when the abnormal temperature sensor value input to the temperature measuring unit 42 falls within the range between the abnormal temperature predetermined value and the temperature sensor reference value, an abnormal temperature of an electronic component is detected as in drawback (2), thereby undesirably interrupting power supply to the electronic components.

SUMMARY OF THE INVENTION

It is, therefore, a principal object of the present invention to solve the drawbacks described above and to provide a cooling abnormality detection system having high reliability.

In order to achieve the above object of the present invention, there is provided a cooling abnormality detection system for external electronic equipment, including a heat exchanger for performing heat exchange of a liquid coolant supplied from the external electronic equipment, a coolant tank for absorbing expansion of the liquid coolant supplied from the heat exchanger, a pump for supplying again the liquid coolant stored in the coolant tank to the external electronic equipment, and a protection unit for detecting a cooling abnormality of the liquid coolant in the electronic equipment. The operation control unit is arranged to stop the power supply to given electronic equipment when the cooling abnormality of the given electronic equipment is detected, thereby preventing reliability degradation or breakdown of the electronic equipment, comprising, flow rate detecting means for detecting a decrease in flow rate of the liquid coolant supplied from the electronic equipment, water level detecting means, arranged in the coolant tank, for detecting a decrease in water level of the liquid coolant, pump operation detecting means, arranged in the pump, for detecting an operation of the pump, and abnormal temperature detecting means for detecting an abnormal temperature of the electronic equipment, wherein the protection unit discriminates the cooling abnormality when the abnormal temperature is detected by the temperature detecting means during the operation of the pump and discriminates the cooling abnormality when an abnormality is detected by any one of the flow rate detecting means, the water level detecting means, and the abnormal temperature detecting means during operation of the pump.

DESCRIPTION OF THE PREFERRED EMBODIMENT

Figure 1:
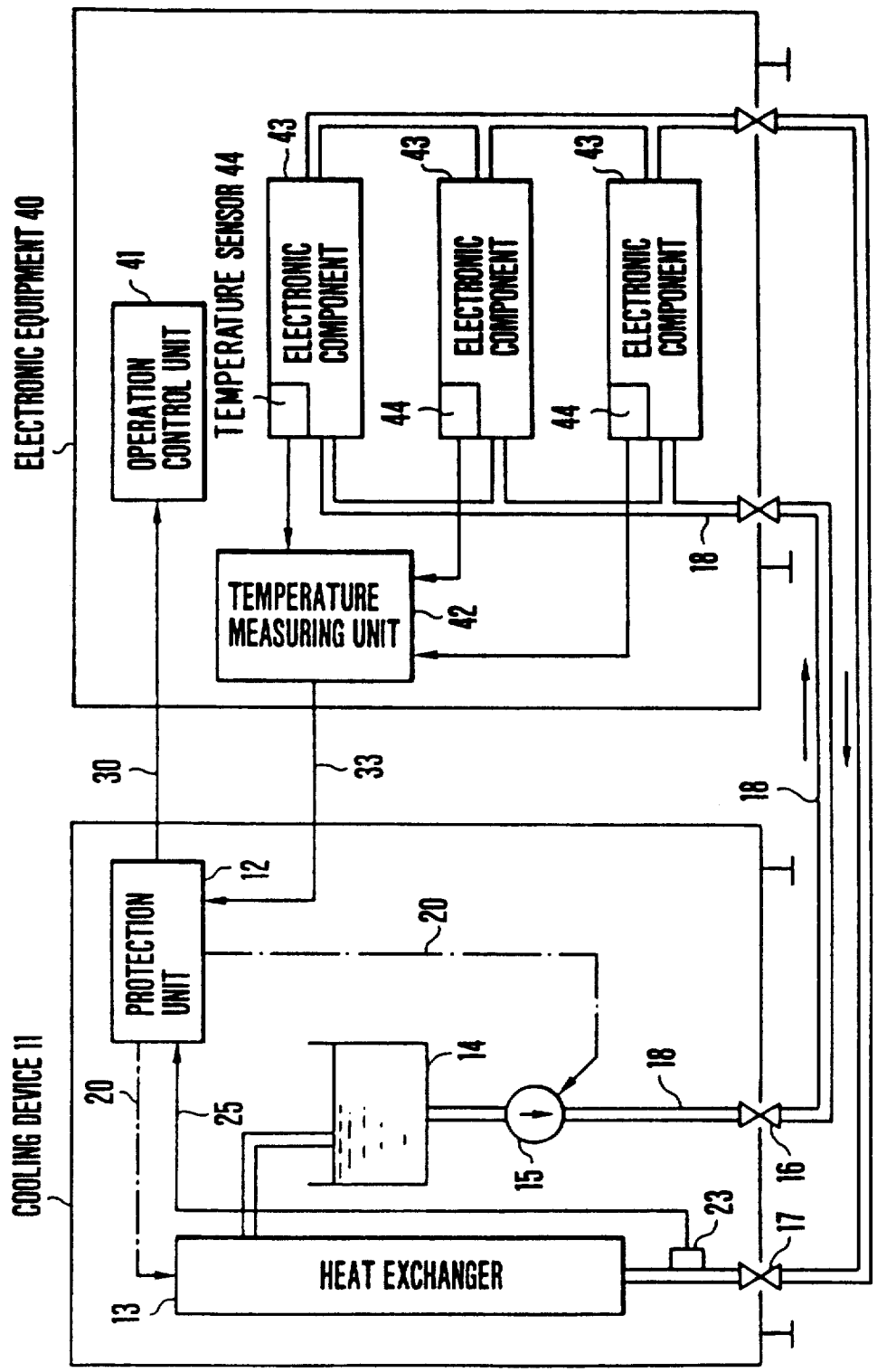
FIG. 1 is a block diagram showing a conventional cooling abnormality detection system.
Figure 2:
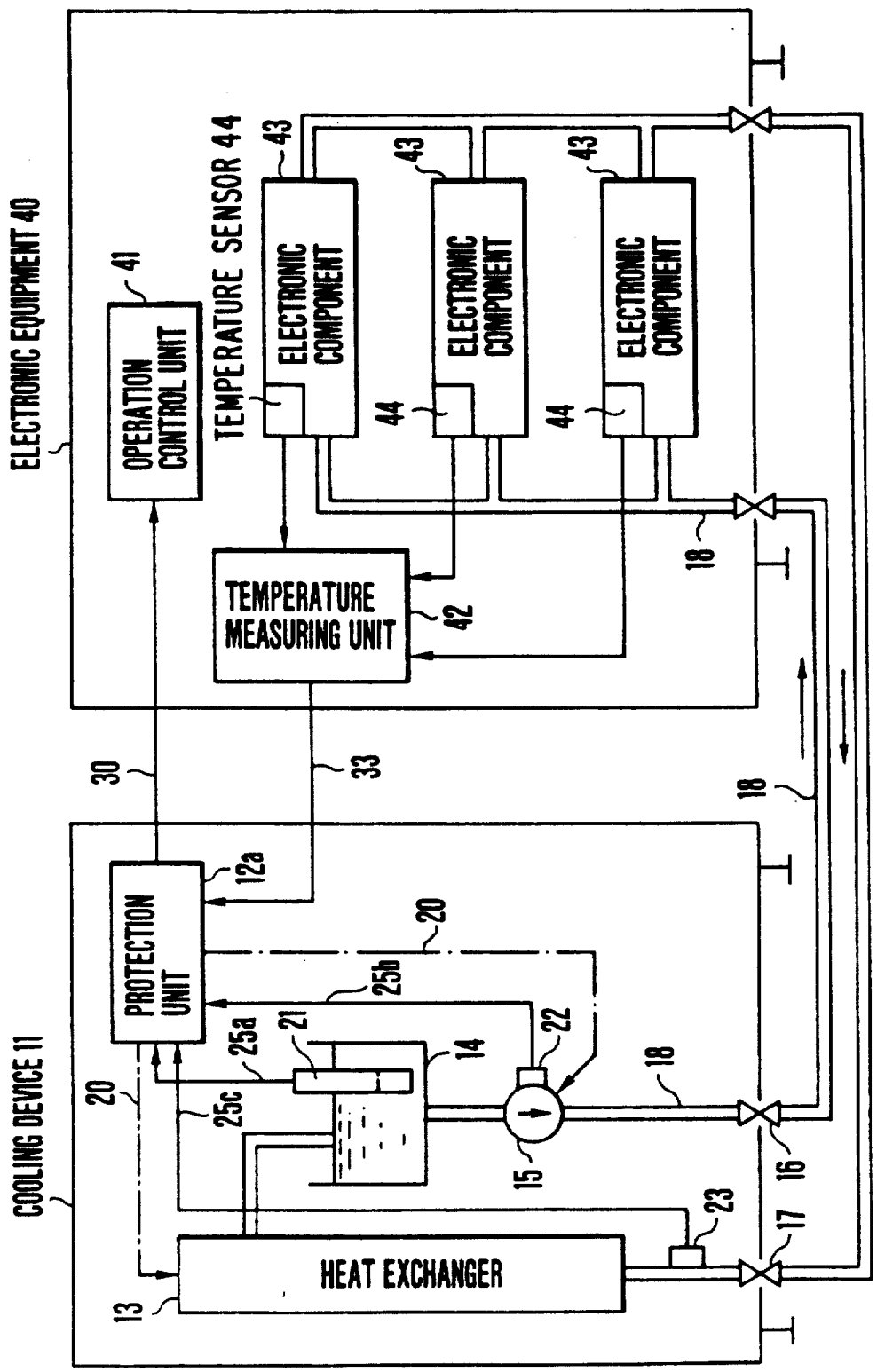
FIG. 2 is a block diagram showing a first embodiment of the present invention.

FIG. 2 is a block diagram showing a first embodiment of the present invention. The same reference numerals as in FIG. 1 denote the same parts in FIG. 2. Reference numeral 12a denotes a protection unit; 21, a water level gauge arranged inside a tank 14; and 22, an eddy current detector arranged in a pump 15.

Figure 3:
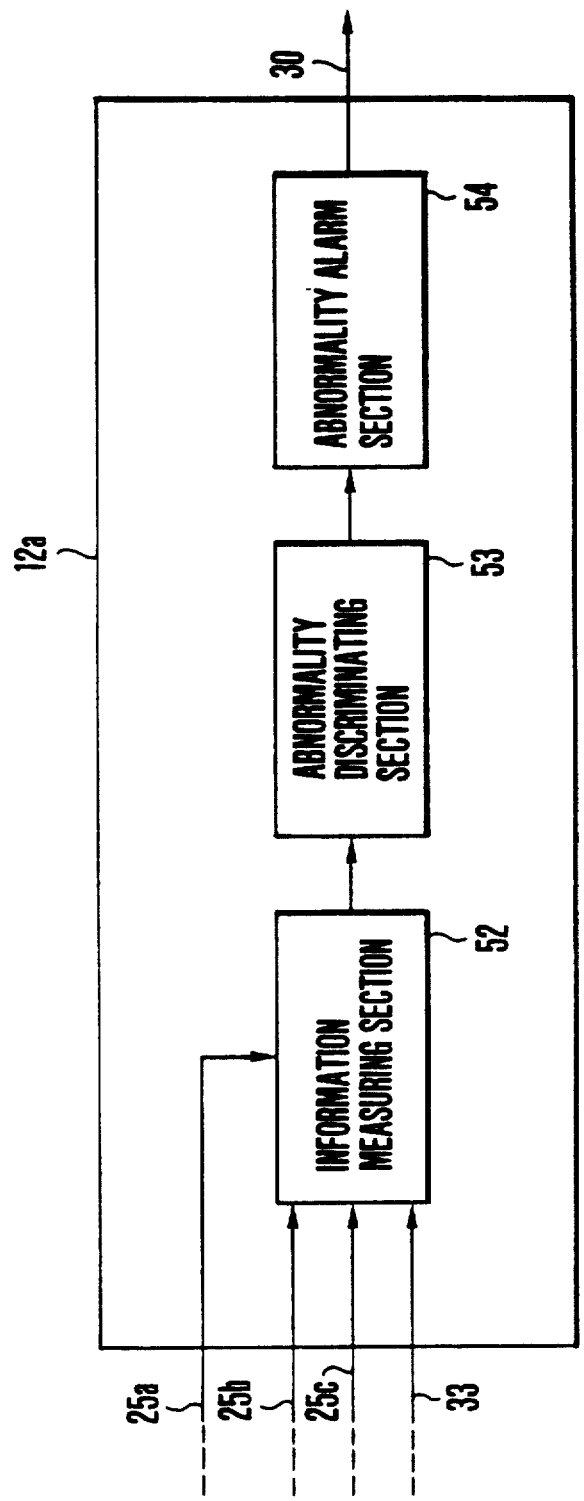
FIG. 3 is a block diagram showing a detailed arrangement of a protection unit shown in FIG. 2.

FIG. 3 is a block diagram showing a detailed arrangement of the protection unit 12a shown in FIG. 2. Reference numeral 52 denotes an information measuring section 52; 53, an abnormality discrimination section; and 54, an abnormality alarm section.

With the above arrangement, when a water level of the tank 14 becomes extremely low, the water level gauge 21 outputs an "abnormal water level" signal to the protection unit 12a through an abnormality detection line 25a. The eddy current detector 22 outputs a signal representing that the pump 15 is in an abnormal state to the protection unit 12a through an abnormality detection line 25b. A flowmeter 23 measures a flow rate of a coolant circulating during the operation of the pump. When a flow rate of the coolant becomes below the predetermined value during the operation of the pump, the flowmeter 23 outputs an "abnormal flow rate" signal to the protection unit 12a through an abnormality detection line 25c. An "abnormal temperature" signal is output from the temperature measuring section 42 to the protection unit 12a through an abnormal temperature signal line 33 in the same manner as in FIG. 1.

Figure 4:
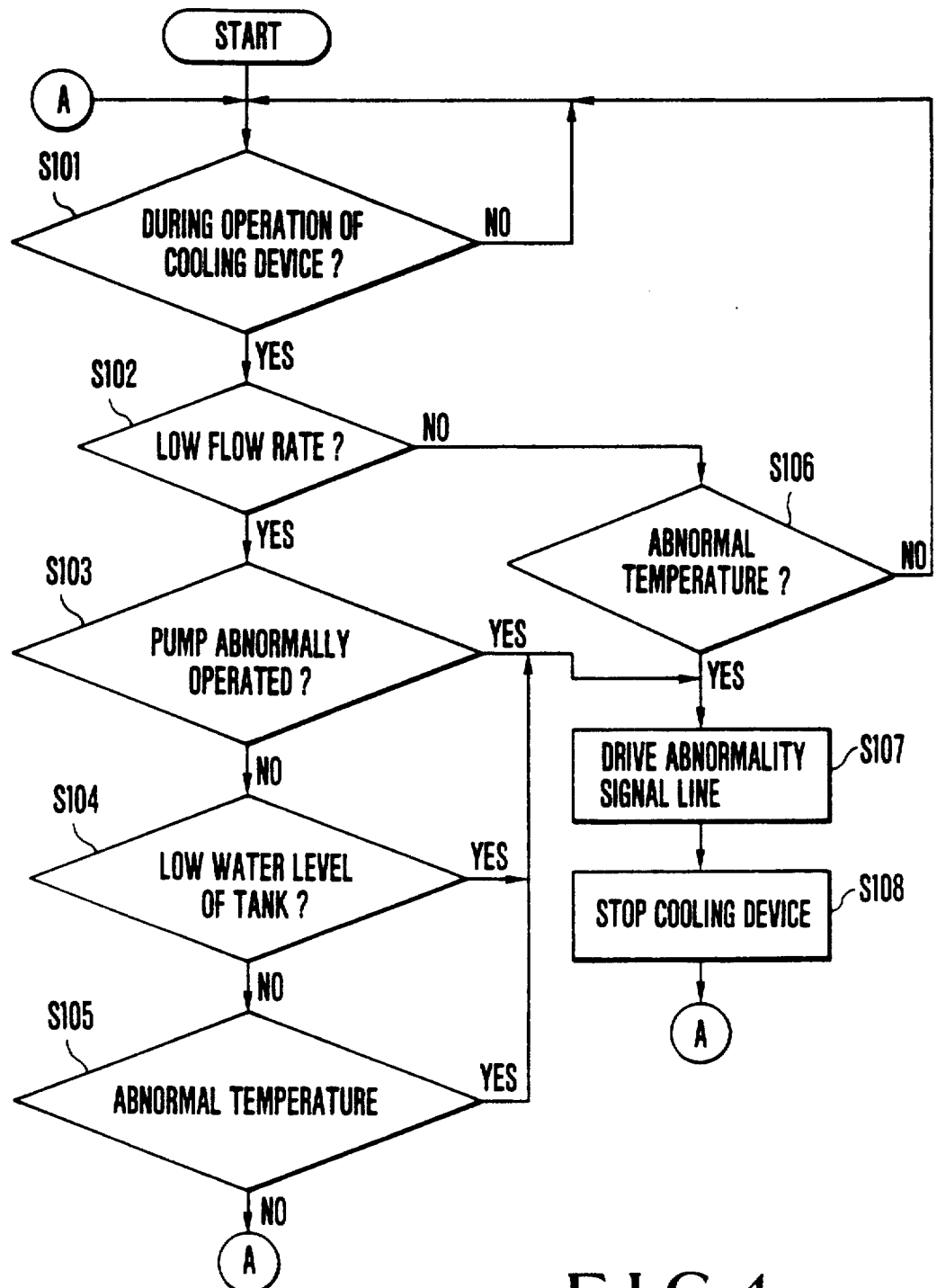
FIG. 4 is a flow chart showing an operation of the protection unit shown in FIG. 2.

As shown in FIG. 3, the protection unit 12a receives signals from the abnormality detection lines 25a to 25c and the abnormal temperature signal line 33. In this case, the protection unit 12a is operated in accordance with a flow chart shown in FIG. 4. When the operation of the protection unit is started, the protection unit determines whether the cooling device is in operation (step 101). If NO in step 101, the protection unit 12a is set in the standby state. However, if YES in step 101, the protection unit 12a determines whether the flow rate of the flowmeter 23 is a "low flow rate" (step 102). If YES in step 102, the eddy current detector 22 detects whether the pump 15 is abnormal (step 103). If NO in step 103, the water level gauge 21 detects whether the water level of the tank 14 is a "low water level" (step 104). If NO in step 104, the temperature measuring section 42 detects whether there is an abnormality in the temperatures of electronic components 43 (step 105). If NO in step 105, the flow returns to step 101 (node A), and the above operations are repeated.

However, if NO in step 102 the temperature measuring section 42 determines a temperature abnormality of the electronic components 43 (step 106). If NO in step 106, the flow returns to step 101. However, if YES in step 106, the protection unit 12a drives an abnormality signal line 30 (step 107) to interrupt power supply to the electronic components 43. The cooling device is stopped (step 108), and the flow returns to step 101 again (node A). If YES in step 103 or 105, the temperature measuring section 42 determines a temperature abnormality of the electronic components 43 (step 106). If YES is step 106; the protection unit 12a is operated to drive the abnormality signal line 30 if YES in step 105, the flow goes to step 107.

In the cooling abnormality detection system of this embodiment, the abnormality is detected by both the flowmeter and other associated abnormality sensors or the like. Therefore, interruption of the electronic equipment caused by an operation error of the flowmeter itself can be prevented with a higher probability. In the absence of the detection of flow rate reduction, the abnormal state of cooling is judged by detecting an abnormal temperature. When the flow rate reduction is detected, the abnormal state of cooling is judged by detecting the abnormal state of the pump, low tank water level or abnormal temperature.

This embodiment can be used in a variety of applications. For example, when a coolant temperature adjustment heater is arranged in the tank 14, overheat of the heater (not shown) must be detected. In this case, true overheat can be discriminated only when an overheat temperature sensor generates an output, the actual water level of the tank 14 is detected as a low water level, and an actual flow rate is detected as a low flow rate.

Figure 5:
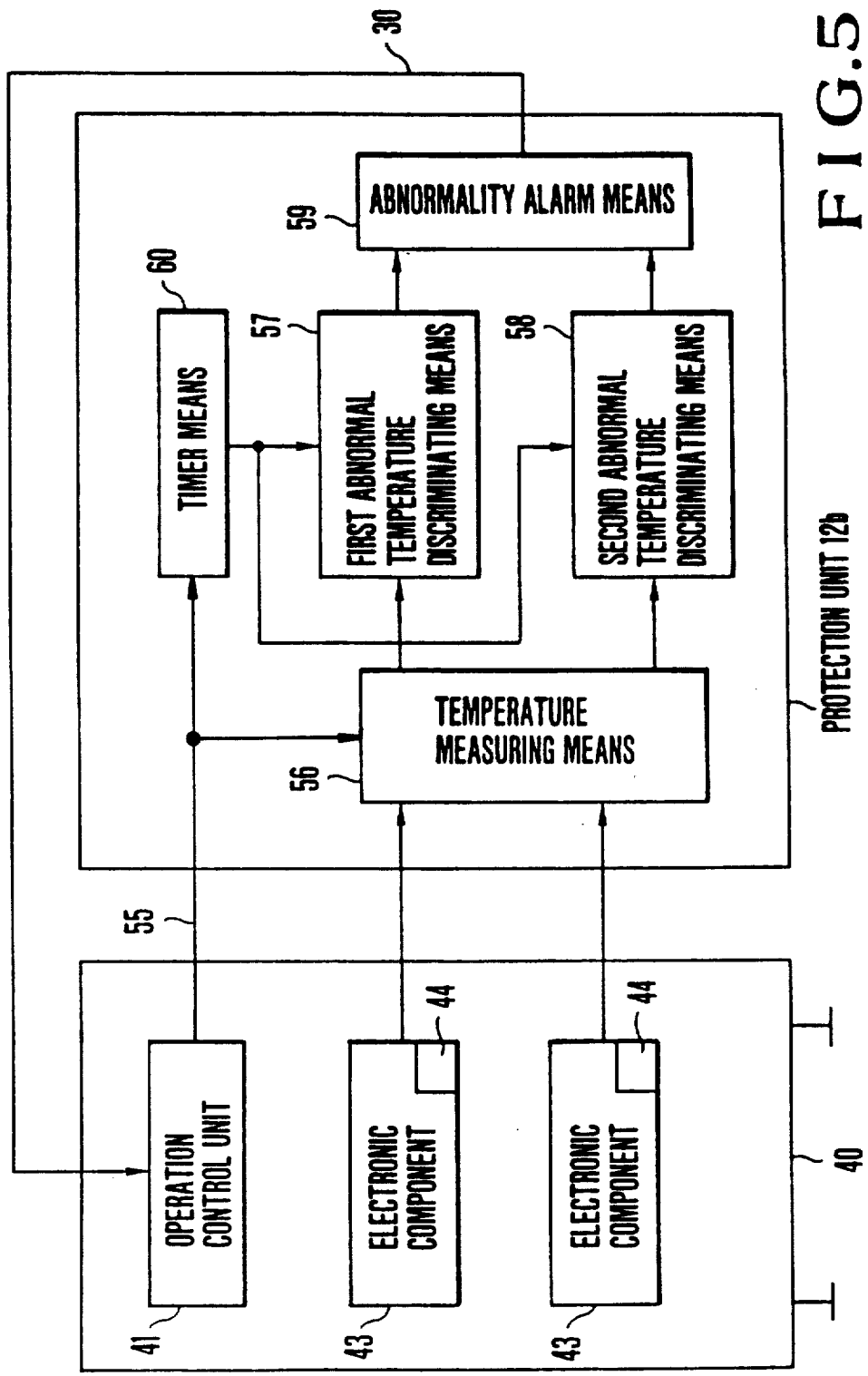
FIG. 5 is a block diagram of a second embodiment of the present invention.

FIG. 5 is a block diagram showing a second embodiment of the present invention. Cooling of a liquid coolant flowing through electronic components 43 is omitted in FIG. 5.

The same reference numerals as in FIG. 1 denote the same parts in FIG. 5. Reference numeral 12b denotes a protection unit. The protection unit 12b comprises a timer means 60 for counting a predetermined period of time and outputting a time-out signal, a temperature measuring means 56 for causing temperature sensors 44 to measure temperatures of electronic components 43, a first abnormal temperature discriminating means 57, operated for the predetermined period of time set in the timer means 60, for discriminating one of the temperatures measured by the temperature measuring means 56 as an abnormal temperature, a second abnormal temperature discriminating means 58, operated after the predetermined period of time set in the timer means 60, for discriminating between two of the temperatures measured by the temperature measuring means 56 as abnormal temperatures, and an abnormality alarm means 59 for receiving the abnormality signals from the first and second abnormal temperature discriminating means 57 and 58 and generating a stop signal through an abnormality signal line 30. The power source signal line 55 is used to supply a power ON signal from an operation control unit 41 to the timer means 60 and the temperature measuring means 56.

With the above arrangement, the temperature measuring means 56 receives the power ON signal from the operation control unit 41 to the electronic components 43 through the power source signal line 55 and causes the temperature sensors 44 arranged in the electronic components 43 to measure temperatures of the electronic components 43 during their operations. When the timer means 60 receives through the power source signal line 55 the power ON signal, which indicates that the electronic components 43 are being powered, the timer means 60 starts counting the predetermined period of time. Each temperature measured by the temperature measuring means 56 is input to both of the abnormal temperature discriminating means 57 and 58.

Until the predetermined period of time is counted up by the timer means 60, only the abnormal temperature discriminating means 57 is operated. Therefore, when one of the temperatures (temperature sensors 44) exceeds the predetermined temperature, the abnormal temperature discriminating means 57 detects an abnormal temperature. When this abnormal temperature is discriminated, the abnormal temperature discriminating means 57 outputs an abnormal temperature signal to the abnormality alarm means 59. Upon reception of the abnormal temperature signal, the abnormality alarm means 59 outputs the signal to the operation control unit 41 through the abnormality signal line 30. Thereafter, the operation control unit 41 interrupts power supply to the electronic components 43 and prevents reliability degradation or breakdown of the electronic components 43 caused by heat.

When the predetermined period of time counted by the timer 60 elapses, temperature measuring control is shifted from the abnormal temperature discriminating means 57 to the abnormal temperature discriminating means 58. The abnormal temperature discriminating means 58 detects an abnormal state when two of the temperatures measured by the temperature sensors 44 are detected as abnormal temperatures. Upon detection of an abnormal state, the same operations as those of the abnormal temperature discriminating means 57 are performed.

Figure 6:
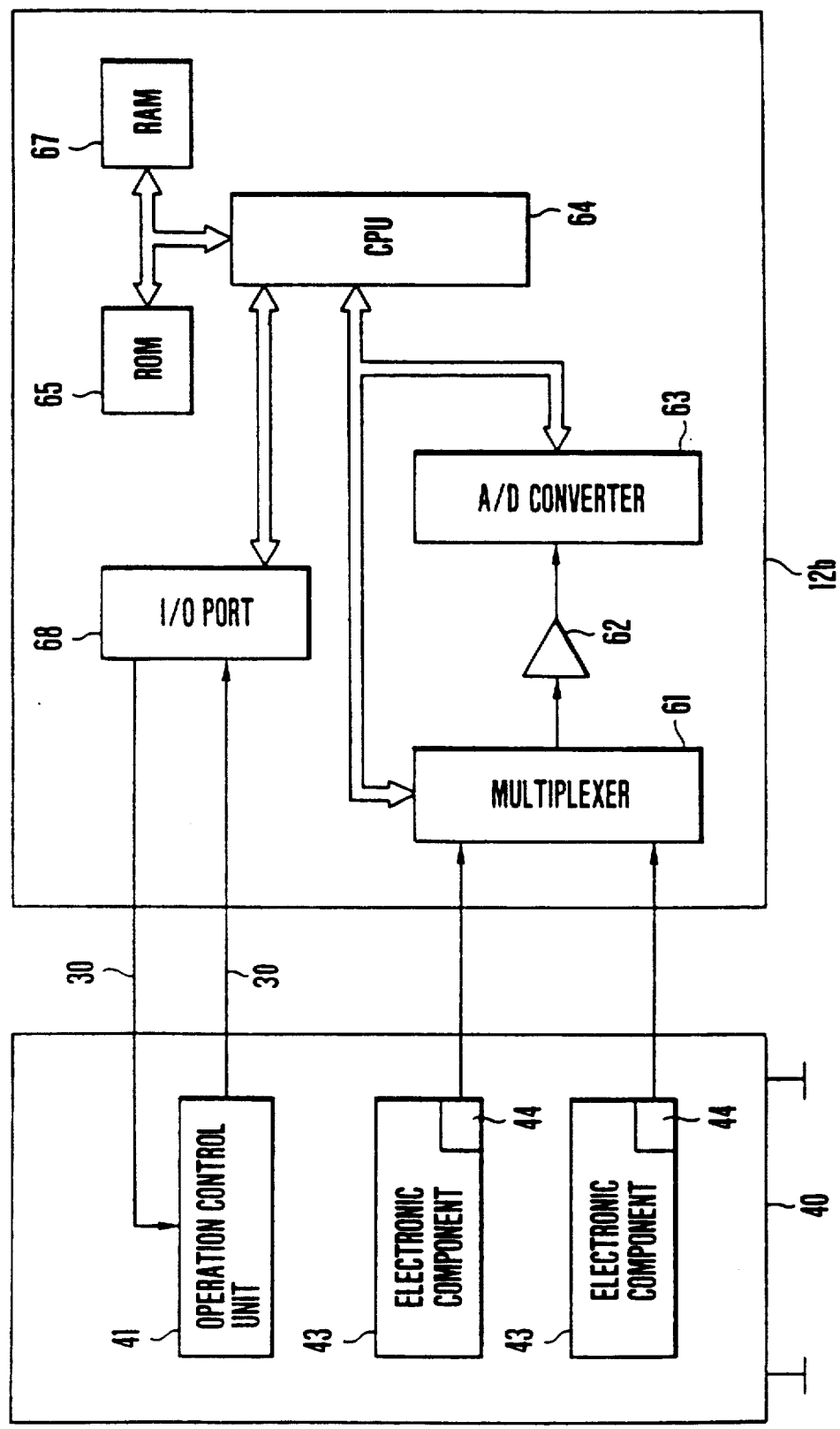
FIG. 6 is a block diagram showing a detailed arrangement of the protection unit shown in FIG. 5.

FIG. 6 is a block diagram showing a detailed internal arrangement of the protection unit 12bA microcomputer system constituting the protection unit 12b comprises a central portion consisting of a CPU 64, a ROM 65, a RAM 67, and an I/O port 68, a multiplexer 61 for selecting one of the plurality of temperature sensors 44, a preamplifier 62, and an A/D converter 63 for fetching temperature data to the CPU 64.

The ROM 65 stores programs necessary for control of the CPU 64 and data necessary for abnormal temperature discrimination. The CPU 64 controls the multiplexer 61 to cause a selected temperature sensor signal to be input to the preamplifier 62. At the same time, the CPU 64 causes the A/D converter 63 to convert the input signal from the preamplifier 62 into digital data. The CPU 64 also controls the I/O port 68 to fetch a power supply start or stop signal representing the start or stop of power supplied from the operation control unit 41 to the electronic components 43 through the power supply signal line 55. When an abnormal temperature is detected, the CPU 64 supplies a power OFF command signal for the electronic components 43 to the operation control unit 41 through the abnormality signal line 30. The above control operations are performed in accordance with software programs, and the necessary control signals are supplied to the respective components to perform abnormal temperature detection.

Figure 7:
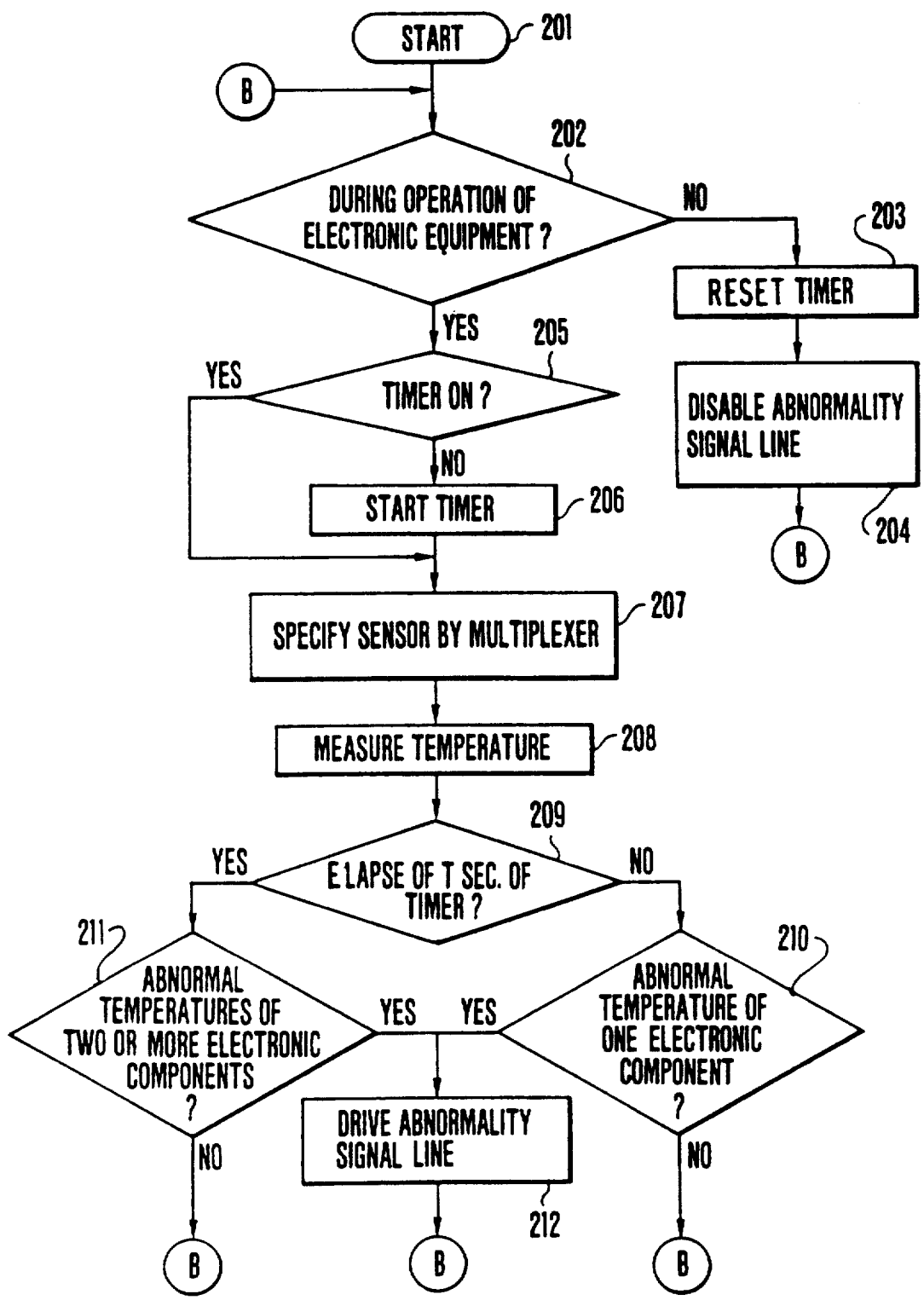
FIG. 7 is a flow chart showing an operation of the protection unit shown in FIG. 5.

FIG. 7 is a flow chart-showing a control program of the protection unit 12b. When the programs runs (step 201), the CPU 64 determines whether electronic equipment 40 is being powered (step 202). If NO in step 202, the timer means 60 is reset (step 203). The signal on the abnormality signal line 30 is disabled (step 204), and the flow returns to step 201 for energization of the electronic equipment 40 (node B). However, if YES in step 202, the CPU 64 determines whether the timer means 60 has been started (step 205). If NO in step 205, the CPU 64 starts the timer 60 (step 206). However, if YES in step 205, step 206 is omitted. One of the plurality of temperature sensors 44 is selected (step 207), and a temperature measurement is performed. The measured temperature is fetched by the temperature measuring means 56 (step 208). The CPU 64 determines whether the predetermined period of time (e.g., 1000 sec.) set in the timer means 60 has elapsed (step 209). If NO in step 209, the CPU 64 determines that an abnormal temperature is detected by one temperature sensor (i.e., one electronic component) (step 210). However, if YES in step 209, the CPU 64 determines whether abnormal temperatures are detected by two or more temperature sensors (i.e., two electronic components) (step 211). If NO in step 210 or 211, the flow returns to step 201 to perform the next temperature measurement (node B). However, if YES in step 210 or 211, the CPU 64 supplies a power OFF command signal to the operation control unit 41 through the abnormality signal line 30, so as to stop the power supply to the electronic components 43 (step 212). The flow then returns to step 201 (node B).

In the cooling abnormality detection system for electronic components of this embodiment, when the predetermined period of time elapses from the power-on timing of the electronic equipment 40, the discrimination operation is switched from the abnormal temperature discriminating means 57 for discriminating one abnormal temperature to the abnormal temperature discriminating means 58 for discriminating two or more abnormal temperatures. Therefore, even if, e.g., one temperature sensor is broken, the abnormal temperature discriminating means 58 does not discriminate an abnormal state, thereby preventing an operation error caused by a temperature sensor failure.

Since two abnormal temperature discriminating means are provided, the abnormal temperature discriminating means 57 discriminates an abnormal temperature caused by an initial abnormality (e.g., a mounting or fixing error of a flat plate of the liquid coolant during exchange at the time of repairing of electronic components) requiring an immediate halt of power to electronic equipment 40. At the same time, when the predetermined period of time elapses from power-on of the electronic equipment 40, the abnormal temperature discriminating means 58 can discriminate an abnormal temperature of the electronic component 43 over a long period of time for which an operation error of the temperature sensor is not allowed.

The above embodiment exemplifies an arrangement in which the temperature sensors 44 are arranged in the electronic components 43, respectively. However, a plurality of temperature sensors may be arranged in each electronic component.

Figure 8:
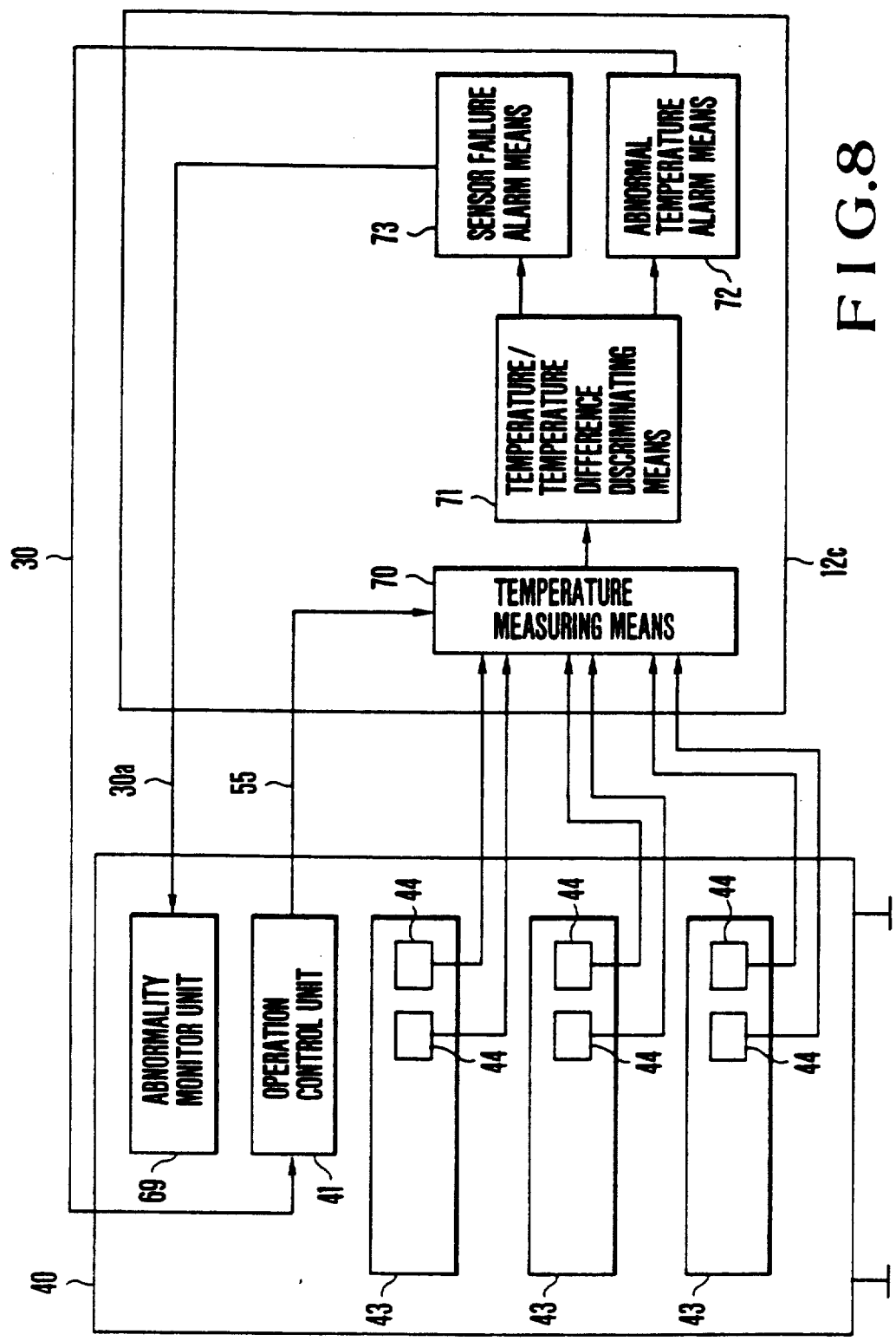
FIG. 8 is a block diagram showing a third embodiment of the present invention.

FIG. 8 is a block diagram showing a third embodiment of the present invention. Cooling of a liquid coolant flowing through electronic components 43 is omitted as in the second embodiment. The same reference numerals as in FIG. 1 denote the same parts in FIG. 8. Two temperature sensors 44 are arranged in each electronic component 43. Reference numeral 12c denotes a protection unit for protecting the electronic components 43 from abnormal temperatures; and 70, a temperature measuring means. The temperature measuring means 70 causes the temperature sensors 44 to measure temperatures of the electronic components 43 during power supply from an operation control unit 41 to the electronic components 43 through a power source signal line 55. The measurement results of the temperature measuring means 70 are discriminated by a temperature/temperature difference measuring means 71. The temperature/temperature difference measuring means 71 compares temperatures detected by the two temperature sensors 44 of each electronic component 43 with a reference temperature and discriminates whether a difference between the two measured temperatures falls within an allowable range.

For example, if a measurement error of the temperature sensor 44 used falls within the range of +2° C., an absolute value of the difference between the measured values of the two temperature sensors 44 is a maximum of 4° C. Therefore, the temperature/temperature difference measuring means 71 discriminates whether the absolute value of the difference between the measured temperatures of the two temperature sensors 44 is a maximum allowable error of 4° C. or less. When the absolute value of the difference between the measured temperatures of the two temperature sensors 44 exceeds the allowable error, the temperature/temperature difference measuring means 71 detects an abnormality of the temperature sensor 44 or a temperature detection system, and supplies an abnormality signal to a sensor failure alarm means 73. Thereafter, the sensor failure alarm means 73 supplies an abnormality signal to an abnormality monitor unit 69 through an abnormality signal line 30a. The abnormality monitor unit 69 signals occurrence of an abnormality to maintenance personnel (not shown). When the absolute value of the difference between the measured temperatures of the two temperature sensors falls within the allowable error and the measured values exceed the reference temperature, the temperature/temperature difference measuring means 71 transmits an abnormality signal to the abnormal temperature alarm means 72. Thereafter, the abnormal temperature alarm means transmits an abnormality signal to the operation control unit 41 through the abnormality signal line 30, and then the operation control unit 41 interrupts power supply to the electronic components 43.

Figure 9:
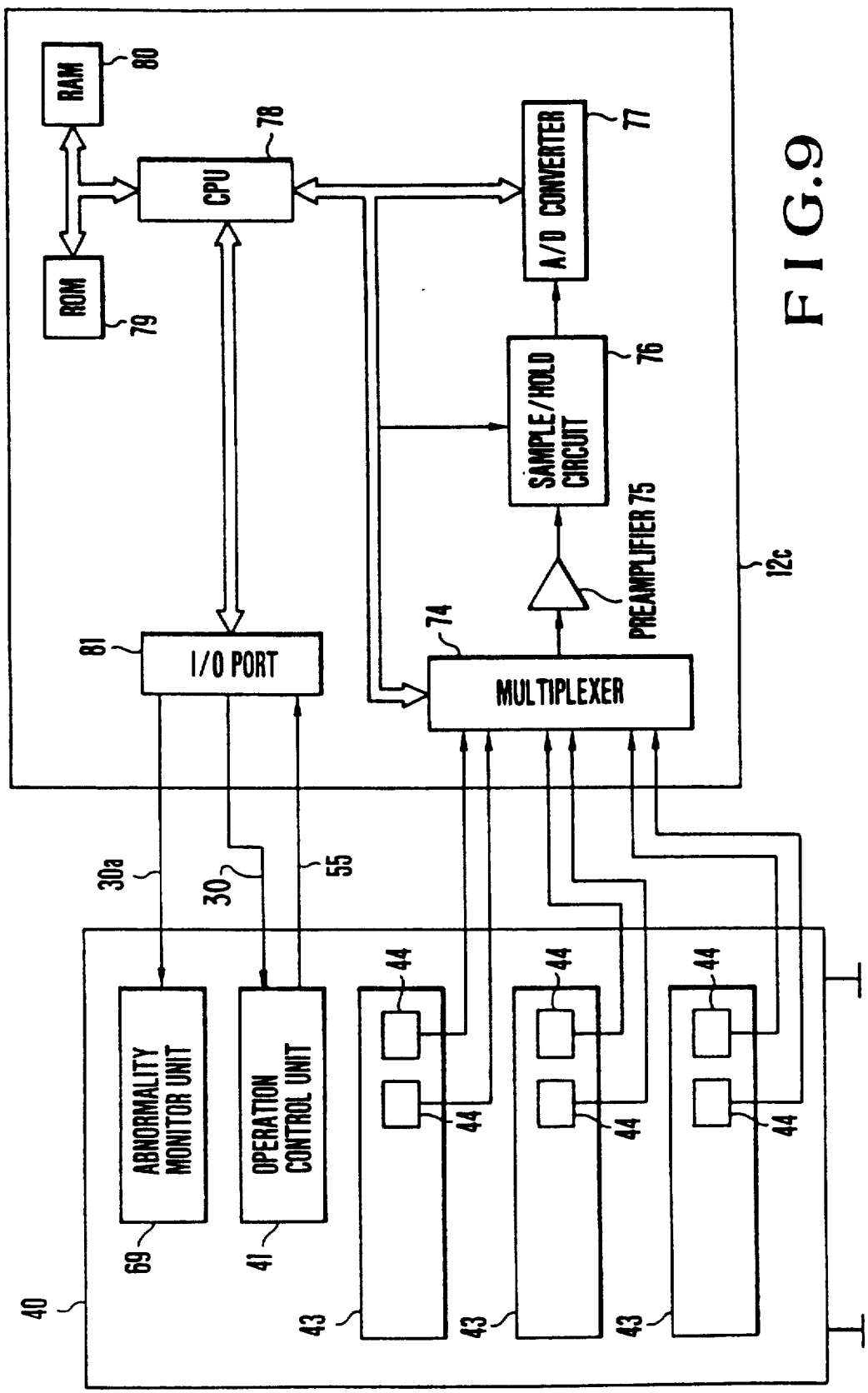
FIG. 9 is a block diagram showing a detailed arrangement of a protection unit shown in FIG. 8.

FIG. 9 is a block diagram of an arrangement of the protection unit of this embodiment using a microcomputer system. The protection unit 12c comprises a central portion consisting of a CPU 78, a ROM 79, a RAM 80, and an I/O port 81, a multiplexer 74 for selecting one of the plurality of temperature sensors 44, a preamplifier 75, a sample/hold circuit 76, and an A/D converter 77 for fetching temperature data into the CPU 78.

The ROM 79 stores programs necessary for control, and data required for abnormality discrimination for hardware consisting of the abnormal temperature discrimination/temperature sensors 44, a cable for connecting the temperature sensor 44 and the multiplexer 74, the preamplifier 75, the sample/hold circuit 76, and the A/D converter 77. The CPU 78 controls the multiplexer 74 and multiplexer 74 transmits a signal of the selected temperature sensor 44 to the preamplifier 75. At the same time, the CPU 78 controls the sample/hold circuit 76, and sample/hold circuit 76 and holds an output value from the preamplifier 75 and transmits it to the A/D converter 77 at an arbitrary timing. In addition, the CPU 78 controls the A/D converter 77 to convert an input from the sample/hold circuit 76 into digital data. The digital data is fetched by the CPU 78. The CPU 78 controls the I/O port 81 to fetch a power start/stop signal from the operation control unit 41 and drives abnormality signal lines 30 and 30a during abnormal states such as temperature abnormal state, a temperature sensor abnormal state, and a temperature detection system abnormal state. These control operations are performed in accordance with software programs, and the necessary control signals are supplied to the respective components, thereby performing abnormality detection operations such as an abnormal temperature detection, a sensor failure detection, and a temperature detection system failure detection.

Figure 10:
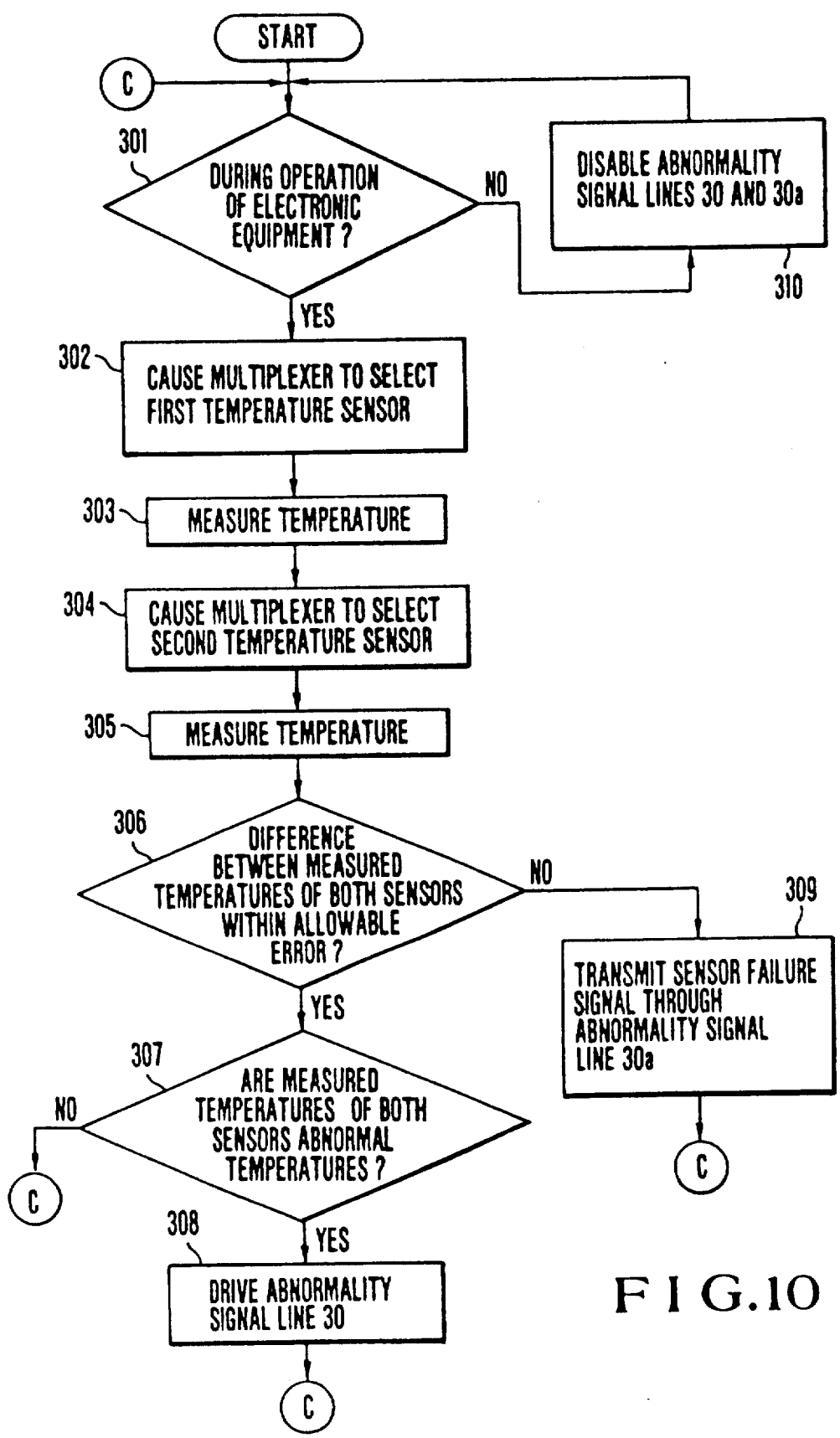
FIG. 10 is a flow chart showing an operation of the protection unit shown in FIG. 8.

FIG. 10 is a flow chart of a control program showing the above operation. When the program runs, the CPU 78 determines that the electronic equipment is powered (step 301). If NO in step 301, the abnormal signal lines 30 and 30a are disabled (step 310), and the flow returns to step 301. However, if YES in step 301, the CPU 78 causes the multiplexer to select the first temperature sensor of one of the electronic components (step 302). A temperature measurement of the first temperature sensor is performed, and the measurement result is fetched by the CPU 78 (step 303). The second temperature sensor of the sample electronic component is selected by the multiplexer (step 304), and a temperature measurement is performed (step 305). The CPU 78 then determines whether an absolute value of a difference between the measured temperatures falls within the allowable error (step 306). If NO in step 306, a sensor failure (including a failure of the temperature detection system) is signaled through the abnormality signal line 30a (step 309), and the flow returns to step 301 (node C). However, if YES in step 306, the CPU 78 determines whether both the measured temperatures are abnormal temperatures (step 307). If NO in step 307, the flow returns to step 301 (node C). However, if YES in step 307, the abnormality signal line 30 is driven (step 308), and then the flow returns to step 301 (node C).

In the cooling abnormality detection system of this embodiment, temperatures of each electronic component are measured by two temperature sensors, and the abnormal temperature is discriminated on the basis of the measured temperatures and the difference between the measured temperatures. Therefore, a detection error of an abnormal temperature which is caused by a failure of the temperature sensor itself or the temperature detection system can be prevented with a high probability.

What is claimed is:

1. A cooling abnormality detection system for external electronic equipment, including a heat exchanger for performing the heat exchange of a liquid coolant supplied from the external electronic equipment, a coolant tank for absorbing expansion of the liquid coolant supplied from said heat exchanger, a pump for circulating the liquid coolant stored in the coolant tank to the external electronic equipment, and a protection unit for detecting a cooling abnormality of the liquid coolant in said electronic equipment, said protection unit being arranged to stop the power supply to a given electronic equipment when the cooling abnormality of said given electronic equipment is detected, thereby preventing reliability degradation and breakdown of said electronic equipment, said protection unit comprising:

temperature measuring means for detecting the temperature of said electronic equipment while said electronic equipment is being powered;

timer means for starting counting a predetermined period of time when said electronic equipment is powered and for outputting a signal when the predetermined period of item elapses;

first abnormal temperature discriminating means, which operates until a time-out signal is output from said timer means, for discriminating whether one temperature measured by said temperature measuring means is an abnormal temperature;

second abnormal temperature discriminating means, which operates after the time-out signal is output from said timer means, for discriminating whether a plurality of temperatures measured by said temperature measuring means are abnormal temperatures; and abnormality alarm means for receiving an abnormality signal from at least one of said first and second abnormal temperature discriminating means for stopping the power supply to said internal electronic equipment.

* * * * *